US008126078B2

United States Patent
Azadet

(10) Patent No.: US 8,126,078 B2
(45) Date of Patent: *Feb. 28, 2012

(54) METHOD AND APPARATUS FOR REDUCING NOISE IN AN UNBALANCED CHANNEL USING COMMON MODE COMPONENT

(75) Inventor: Kameran Azadet, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 2759 days.

This patent is subject to a terminal disclaimer.

(21) Appl. No.: 10/610,335

(22) Filed: Jun. 30, 2003

(65) Prior Publication Data

US 2005/0018777 A1    Jan. 27, 2005

Related U.S. Application Data

(60) Provisional application No. 60/443,261, filed on Jan. 28, 2003.

(51) Int. Cl.
*H04B 15/00* (2006.01)
*H04B 3/20* (2006.01)
*H04B 1/10* (2006.01)
*H03H 7/30* (2006.01)
*H04L 25/08* (2006.01)

(52) U.S. Cl. ........ 375/285; 375/257; 375/232; 375/346; 375/350

(58) Field of Classification Search .......... 375/229–236, 375/350, 286, 290, 219, 222, 256–258, 285, 375/295, 296, 316, 346; 379/406.01, 406.08, 379/3, 93.01, 406.06; 370/290, 201, 276, 370/282, 286, 289

See application file for complete search history.

(56) References Cited

U.S. PATENT DOCUMENTS

| 4,053,796 | A | * | 10/1977 | Van De Plassche | .......... | 327/104 |
| 4,268,727 | A | * | 5/1981 | Agrawal et al. | .......... | 379/406.08 |
| 4,821,223 | A | * | 4/1989 | David | .......... | 708/308 |
| 5,163,044 | A | * | 11/1992 | Golden | .......... | 370/286 |
| 5,327,303 | A | * | 7/1994 | Smith | .......... | 360/67 |
| 5,495,173 | A | * | 2/1996 | Bockelman et al. | .......... | 324/625 |
| 5,887,032 | A |   | 3/1999 | Cioffi | .......... | 375/257 |
| 5,983,254 | A |   | 11/1999 | Azadet | .......... | 708/300 |

(Continued)

FOREIGN PATENT DOCUMENTS

EP    1 001 553 A2    5/2000

(Continued)

*Primary Examiner* — Tesfaldet Bocure
(74) *Attorney, Agent, or Firm* — Ryan, Mason & Lewis, LLP

(57) ABSTRACT

A method and apparatus are disclosed for reducing noise, such as external noise, cross-talk and echo, in an unbalanced channel. A cross-talk canceller is disclosed that uses a multi-dimensional finite impulse response filter to process both the differential, d, and common-mode, c, components of a received signal. Recovery of the differential mode component of the received signal is improved by reducing the contribution of the common mode component. The common mode component of a received signal may be expressed, for example, as the average of two voltages or two current signals. The differential and common mode components of the received signal are equalized. The disclosed multi-dimensional cross-talk canceller reduces external noise; near-end crosstalk resulting from differential and common mode components on one twisted pair interfering with another twisted pair; and echo crosstalk resulting from differential and common mode cross-talk components on the same twisted pair.

31 Claims, 3 Drawing Sheets

U.S. PATENT DOCUMENTS

| | | | |
|---|---|---|---|
| 5,995,567 A * | 11/1999 | Cioffi et al. | 375/346 |
| 6,052,420 A * | 4/2000 | Yeap et al. | 375/346 |
| 6,272,177 B1 * | 8/2001 | Murakami et al. | 375/240.03 |
| 6,459,739 B1 * | 10/2002 | Vitenberg | 375/258 |
| 6,546,057 B1 * | 4/2003 | Yeap | 375/285 |
| 6,618,774 B1 * | 9/2003 | Dickens et al. | 710/64 |
| 6,940,973 B1 * | 9/2005 | Yeap et al. | 379/416 |
| 6,999,504 B1 * | 2/2006 | Amrany et al. | 375/222 |
| 7,003,094 B2 * | 2/2006 | Fischer et al. | 379/406.01 |
| 7,020,212 B1 * | 3/2006 | Strait | 375/260 |
| 7,058,125 B2 * | 6/2006 | Cherubini | 375/225 |
| 7,107,031 B2 * | 9/2006 | Kristensson et al. | 455/296 |
| 7,167,883 B2 * | 1/2007 | Greiss et al. | 708/319 |
| 7,548,599 B2 * | 6/2009 | Azadet | 375/350 |
| 2001/0038674 A1 * | 11/2001 | Trans | 375/355 |
| 2001/0050987 A1 * | 12/2001 | Yeap et al. | 379/399.01 |
| 2002/0072331 A1 * | 6/2002 | Fischer et al. | 455/63 |
| 2003/0016770 A1 * | 1/2003 | Trans et al. | 375/346 |
| 2003/0054787 A1 * | 3/2003 | Behzad et al. | 455/234.1 |
| 2004/0014424 A1 * | 1/2004 | Kristensson et al. | 455/63.1 |
| 2004/0170230 A1 * | 9/2004 | Zimmerman et al. | 375/285 |

FOREIGN PATENT DOCUMENTS

| | | |
|---|---|---|
| EP | 1 255 359 A1 | 11/2002 |
| EP | 1 443 675 A2 | 8/2004 |
| WO | WO 97/40587 | 8/1995 |
| WO | WO 97/40587 A | 10/1997 |
| WO | WO 99/46867 | 9/1999 |

* cited by examiner

METHOD AND APPARATUS FOR REDUCING NOISE IN AN UNBALANCED CHANNEL USING COMMON MODE COMPONENT

CROSS REFERENCE TO RELATED APPLICATIONS

This application claims the benefit of U.S. Provisional Application No. 60/443,261, filed Jan. 28, 2003; and is related to U.S. patent application Ser. No. 10/610,334, now issued as U.S. Pat. No. 7,548,592 issued on Jun. 16, 2009 entitled, "Method and Apparatus for Reducing Cross-Talk With Reduced Redundancies," and U.S. patent application Ser. No. 10/610,336, now issued as U.S. Pat. No. 7,263,541 issued on Aug. 28, 2007 entitled, "Multi-Dimensional Hybrid and Transpose Form Finite Impulse Response Filters," each incorporated by reference herein.

FIELD OF THE INVENTION

The present invention relates generally to noise removal techniques, and more particularly, to methods and apparatus for reducing noise, such as cross-talk, on unbalanced channels.

BACKGROUND OF THE INVENTION

FIG. 1 illustrates a transceiver 100 that transmits and receives signals on a twisted pair (TP) 110. The transceiver 100 may be associated, for example, with a local area network (LAN) or a digital subscriber loop (xDSL). The main sources of crosstalk in such a transceiver 100 are usually near-end crosstalk (NEXT) and echo crosstalk. Each transceiver, such as the transceiver 100, transmits a first signal, $V_1$, and receives a different signal, $V_2$, on the same twisted pair 110. $V_1$ corresponds to the transmitted signal generated by the transceiver 100. $V_2$ corresponds to the received signal generated by a second transceiver 120. Since the transceiver 100 knows the transmitted signal, $V_1$, that it has generated, the transceiver 100 employs a "hybrid component" to subtract the transmitted signal, $V_1$, from the voltage $(V_1+V_2)$ on the twisted pair (TP) 110, to obtain the voltage corresponding to the received signal $V_2$.

Near-end crosstalk results from transmitting and receiving different signals on different twisted pairs 110 and having a signal on one twisted pair interfering with the signal on another twisted pair. Echo crosstalk, on the other hand, is the result of crosstalk on the same twisted pair 110 and of discontinuous impedances along a given path, for example, at each connector. When the transceiver 100 transmits a signal, $V_1$, each impedance discontinuity along the path causes the transceiver 100 to receive a wave or echo back. Thus, a transceiver typically includes a near end cross-talk and echo canceller 200, discussed further below in conjunction with FIG. 2, to address the near end cross-talk and echo cross-talk and to improve the recovery of the transmitted signal.

Conventional near end cross-talk and echo cancellers, generally referred to as cross-talk cancellers, have assumed that a channel is balanced (i.e., each twisted pair is purely differential). It has been found, however, that common mode noise impacts the balance of the differential signals and that the "balanced" signal assumption does not hold well, especially at high frequencies. Conventional near end cross-talk and echo cancellers, however, have not accounted for common mode noise and have failed to exploit the information contained in the common mode component of the received signal. In particular, conventional cross-talk cancellers do not account for differential-to-common mode and common mode-to-differential conversion transfer functions of the twisted pair. One of the main benefits of accounting for common mode noise is mitigation of noise, such as alien cross-talk and RF interference. Such noise sources are not known a priori, and therefore cannot be cancelled using conventional cross-talk cancellation techniques. A need therefore exists for a cross-talk canceller that compensates for common mode noise.

SUMMARY OF THE INVENTION

Generally, a method and apparatus are disclosed for reducing noise in an unbalanced channel. The present invention recognizes that common mode signals contain significant information that can be exploited to reduce the effect of external sources of noise or cross-talk. A cross-talk canceller is disclosed that uses a multi-dimensional filter, such as a multi-dimensional finite impulse response (FIR) filter, to reduce noise and cross-talk based on the differential, d, and common-mode, c, components on each twisted pair. Common mode noise impacts the balance of differential signals in twisted pairs. The present invention recognizes that the common mode component of the received signal can provide additional information to be exploited, including information about the presence of external noise. When a channel is balanced, the common mode component of the received signal will be zero. The present invention improves the recovery of the differential mode component of the received signal by reducing the contribution of the common mode component. The common mode component of a received signal may be obtained, for example, as an average of two voltages or two current signals.

Generally, cross-talk cancellation techniques remove cross-talk that is contributed to the signal received by a transceiver on a given twisted pair by the signal transmitted by the same transceiver on the same and other twisted pairs. As previously indicated, conventional techniques address only the contribution of the differential mode components. The present invention initially generates the differential, d, and common-mode, c, components of the signals received by a transceiver on each twisted pair and generates a vector representation thereof. Thereafter, the vector representation of the received signal is equalized. Equalizing a vector representation that includes the common mode components also serves to reduce the external noise in the received signal. A multi-dimensional cross-talk canceller processes a vector representation of the differential, d, and common-mode, c, components of the corresponding signals transmitted by the transceiver on each twisted pair. An adder sums the equalized vector representation of the signals received by the transceiver and the processed vector representation of the signals transmitted by the transceiver to generate an estimate of the received signal on each twisted pair. In this manner, the present invention reduces (i) cross-talk from external noise sources, such as alien cross-talk or RF interference; (ii) near-end crosstalk resulting from differential and common mode components on one twisted pair that interferes with another twisted pair; and (iii) echo crosstalk resulting from differential and common mode cross-talk components on the same twisted pair. The multi-dimensional finite impulse response filter may be embodied, for example, in direct, hybrid or transpose forms or another implementation of a finite impulse response filter.

A more complete understanding of the present invention, as well as further features and advantages of the present invention, will be obtained by reference to the following detailed description and drawings.

DETAILED DESCRIPTION

Figure 1:
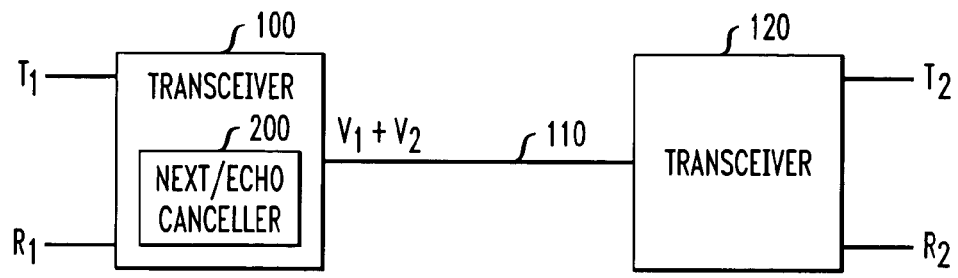
FIG. 1 illustrates a conventional transceiver that transmits and receives signals on the same twisted pair (TP)
Figure 2:
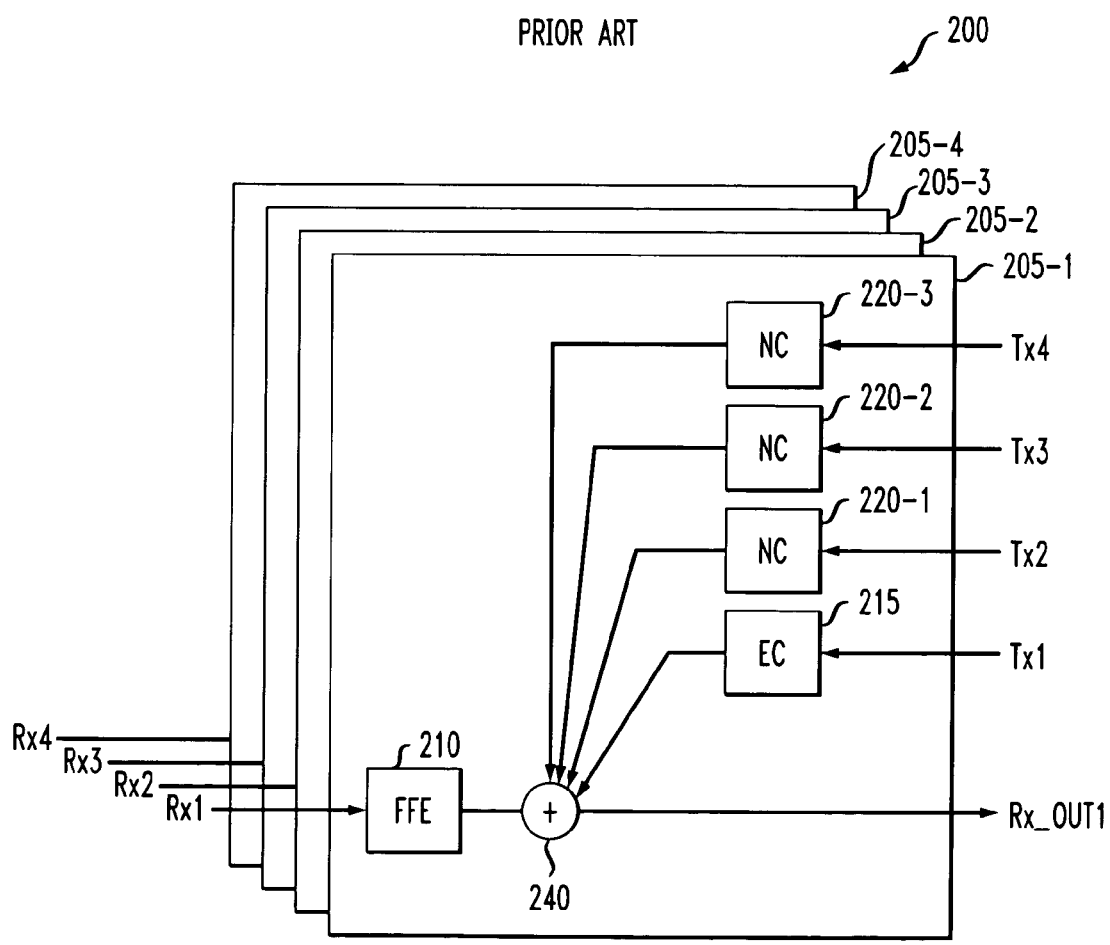
FIG. 2 illustrates a conventional near end cross-talk and echo canceller that may be employed in the transceivers of FIG. 1.

FIG. 2 illustrates a conventional near end cross-talk and echo canceller 200 that may be employed in the transceivers 100, 120 of FIG. 1. The exemplary near end cross-talk and echo canceller 200 processes four received differential signals, Rx1 through Rx4, each received on a unique twisted pair. As shown in FIG. 2, each of the four received differential signals, Rx1 through Rx4, are processed separately at stages 205-1 through 205-4, respectively. Each cross-talk and echo cancellation stage 205 equalizes the received signal using, for example, a feed forward equalizer 210, in a known manner.

In addition, each cross-talk and echo cancellation stage 205 includes an echo canceller 215 to address the echo crosstalk that is primarily the result of crosstalk on the same twisted pair, such as the twisted pair carrying the received signal Rx1 and the transmitted signal Tx1. As shown in FIG. 2, each cross-talk and echo cancellation stage 205 also includes near end cross-talk and echo cancellers 220-1 through 220-3 to address the near-end crosstalk that results from transmitting and receiving different signals on different twisted pairs and having a signal on one twisted pair interfering with the signal on another twisted pair. For example, near end cross-talk and echo canceller 220-1 addresses the cross-talk in the first received signal, Rx1, caused by the second transmitted signal, Tx2. Likewise, near end cross-talk and echo canceller 220-2 addresses the cross-talk in the first received signal, Rx1, caused by the third transmitted signal, Tx3. The outputs of the feed forward equalizer 210, echo canceller 215 and near end cross-talk and echo cancellers 220-1 through 220-3 are summed by an adder 240 to generate an estimate of the first received signal, Rx1out.

As previously indicated, it has been found that conventional near end cross-talk and echo cancellers, such as the NEXT/echo canceller 200 shown in FIG. 2, do not account for common mode noise, which will impact the balance of the differential signals in the twisted pairs. In addition, such conventional NEXT/echo cancellers 200 are not effective in the presence of external noise. The present invention recognizes that the common mode component of the received signal can provide additional information to be exploited, including information about the presence of external noise.

Redundancies result from the same operation (e.g., a delay) being applied to the same input (e.g., Tx1) multiple times. The present invention recognizes that the redundancies can be reduced or even removed entirely by processing the signals received on each twisted pair in a vector form, where the vector includes an element corresponding to each twisted pair. Thus, the signals received on each twisted pair, and the cross-talk effect that each signal has on one another, is performed collectively, rather than as a series of independent computations.

Figure 3:
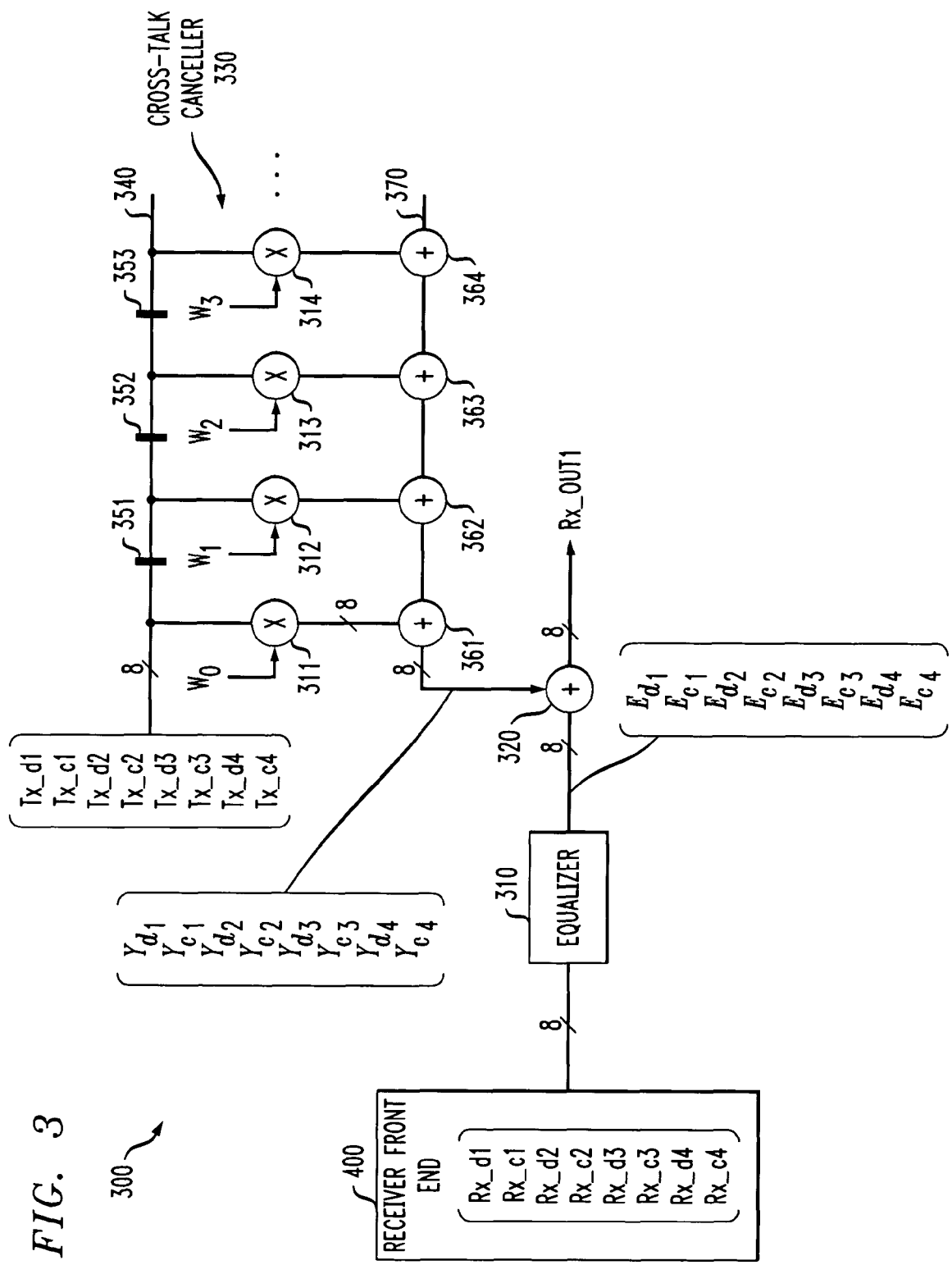
FIG. 3 illustrates a cross-talk canceller incorporating features of the present invention.

FIG. 3 illustrates a cross-talk and echo canceller 300 incorporating features of the present invention. Generally, as discussed further below, the present invention uses multi-dimensional finite impulse response (FIR) filters to process both differential, d, and common-mode, c, signals. Each cross-talk and echo cancellation stage 205 for a given twisted pair may be embodied using a cross-talk and echo canceller 300. As shown in FIG. 3, the received signal is initially processed by a receiver front end 400, discussed below in conjunction with FIG. 4, that generates a differential, d, and common-mode, c, signal for each twisted pair.

The present invention recognizes that the differential, d, and common-mode, c, signal for each twisted pair can be expressed in a vector form (comprised of eight elements), as shown in FIG. 3. The vector representation of the differential and common mode components of the received signal includes, for example, eight elements in the four twisted pair case. The processing of the vector representation of the differential and common mode components of the received signal is further described in U.S. patent application Ser. No. 10/610,334 entitled, "Method and Apparatus for Reducing Cross-Talk With Reduced Redundancies," and U.S. patent application Ser. No. 10/610,336 entitled, "Multi-Dimensional Hybrid and Transpose Form Finite Impulse Response Filters," each incorporated by reference herein. The cross-talk and echo canceller 300 thereafter equalizes the vector representation of the received signal using, for example, a feed forward equalizer 310, in a known manner. The feed forward equalizer 310 may be embodied, for example, as a multi-dimensional finite impulse response filter, in the same manner as the cross-talk canceller 330, discussed hereinafter. It is noted that equalization of the common mode components by the equalizer 310 will serve to remove external noise from the received signal, since the noise will generally be the same on each wire of each twisted pair. The external noise may be, for example, alien cross-talk from another twisted pair.

As shown in FIG. 3, the cross-talk and echo canceller 300 includes a cross-talk canceller 330 that may be embodied, for example, as a direct form of a finite impulse response (FIR) filter (with delays in the input path) of another FIR filter. As shown in FIG. 3, the cross-talk canceller 330 comprises multipliers 311 through 314 having four taps with filter weights or tap coefficients, $W_0$ through $W_3$, respectively. These filter weights represent matrix multiplicands to be multiplied by input data traversing input path 340. In accordance with the known direct form, delay elements 351 through 353, which may be shift registers, are inserted on input path 340 and each disposed between two multipliers. In addition, adders 361 through 364 are disposed on output path 370 and each connected at the output of a multiplier. With such an arrangement, the z-transform of the transfer function of cross-talk canceller 330, H(z), is:

$$H(z) = W_0 + W_1 z^{-1} + W_2 z^{-2} + W_3 z^{-3} + \ldots \qquad \text{Eq. (1)}$$

For example, the first weight term, $W_0$, in the above equation corresponds to no delay and the second term, $W_1 z^{-1}$, corresponds to one stage of delay. It is noted that for a conventional implementation, the weights, $w_n$, applied to each filter tap are scalar values while the weights, $W_n$, applied to each filter tap in the present invention are matrix values (an 8 by 8 matrix in the present example). For a further discussion of suitable finite impulse response filters, see, for example, U.S. Pat. No. 5,983,254, incorporated by reference herein. Extending the finite impulse response filters described in U.S. Pat. No. 5,983,254 to the multi-dimensional case of the present invention is described in U.S. patent application Ser. No. 10/610, 336 entitled, "Multi-Dimensional Hybrid and Transpose Form Finite Impulse Response Filters"

The multipliers 311 through 314 each perform a matrix multiplication operation. For example, for four twisted pairs, each multiplication is a multiplication of an 8 by 8 matrix by an eight component vector. As shown in FIG. 3, the output of the cross-talk canceller 330 can be expressed as:

$$Y(z)=H(z)Tx(z),$$

where H(z) is a matrix, defined above, and Tx(z) is the vector representation of the transmitted signal. In the time domain, the output, Yn, of the output of the cross-talk canceller 330 can be expressed as:

$$Y_n = W_0 Tx_n + W_1 Tx_{n-1} + W_2 Tx_{n-2} + \ldots$$

where n has a value between 1 and 8 in the present example.

In addition, the adders 361 through 364 each perform a vector addition of the eight components. Thus, the output, Rx_out1, is a column matrix comprised of the eight components (a differential and common mode component for each twisted pair). The output of the cross-talk canceller 330 is added to the output of the equalizer 310 by an adder 320, to generate an estimate of the first received signal, Rx1out (for the first twisted pair). Thus, the adder 320 adds the corresponding components of the equalized signal, En, and the cross-talk cancelled signal, Yn. One or more of the common mode components of the received signal, Rx1out, may not be of interest and can be ignored or not computed in order to reduce complexity.

Figure 4:
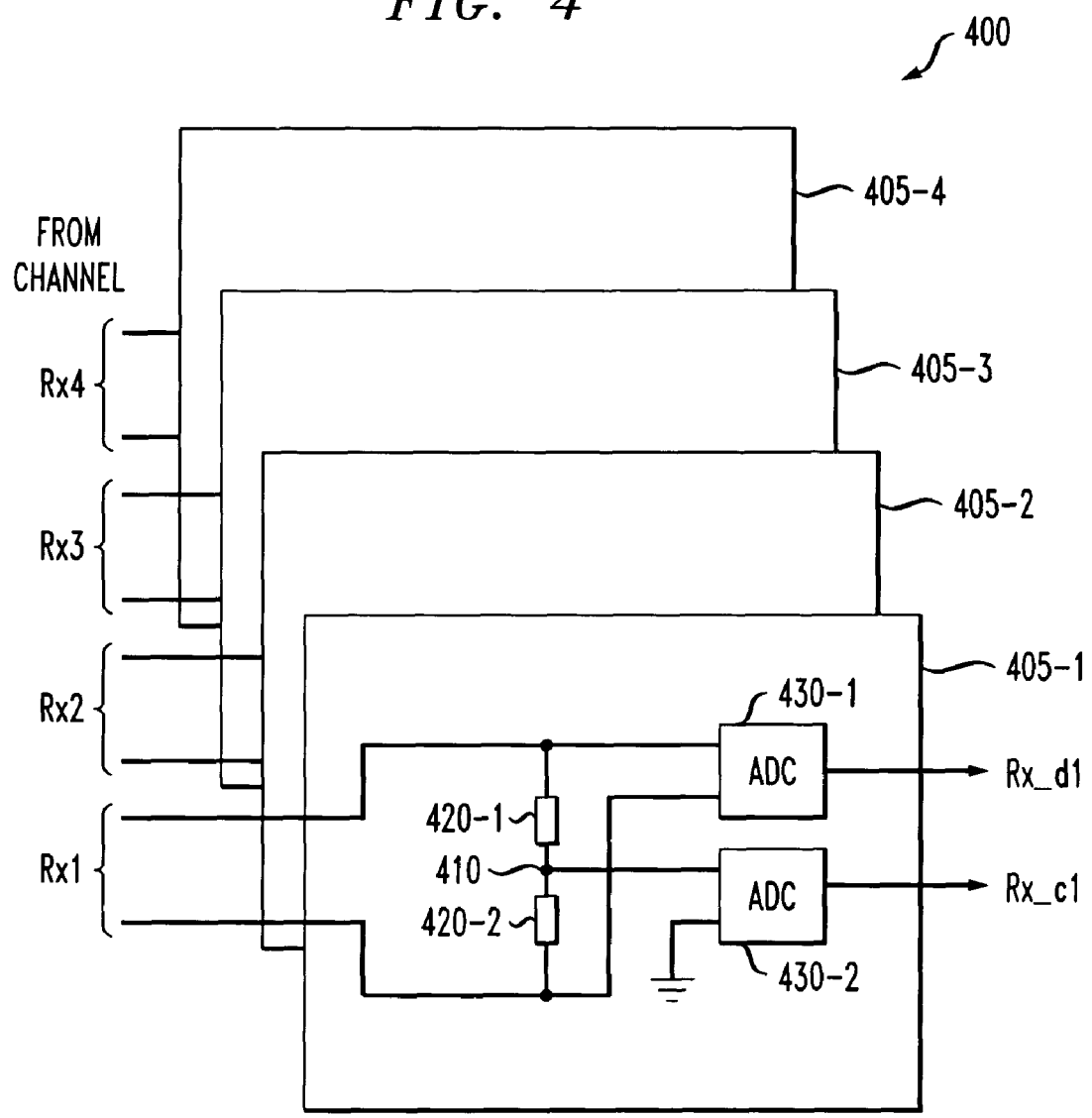
FIG. 4 is a schematic block diagram of a receiver front end incorporating features of the present invention.

FIG. 4 is a schematic block diagram of a receiver front end 400 incorporating features of the present invention. As previously indicated, the receiver front end 400 generates a received differential, Rxd, and common-mode, Rxc, signal for each twisted pair. As shown in FIG. 4, each of the four received differential signals, Rx1 through Rx4, are processed separately at stages 405-1 through 405-4, respectively. The differential signal, such as Rx_d1, for the first twisted pair, is averaged over two resistors 420-1 and 420-2 and converted to a digital signal by an analog to digital converter 430-1. Likewise, the common mode signal, such as Rx_c1, for the first twisted pair, is obtained at a center tap 410 between the two resistors 410-1 and 410-2 (which provides the average voltage across the two resistors 410) and converted to a digital signal by an analog to digital converter 430-2.

Likewise, similar circuitry can be provided to generate the transmitted differential, Txd, and common-mode, Txc, signal for each twisted pair. It is noted that the transmit signal is often purely differential, with the common mode set to zero. In some cases, designers may intentionally use unbalanced signal to achieve lower power. For example, a single ended signal sets the signal in one wire of the twisted pair to zero and the other wire carries the actual signal. Therefore, the non-zero common mode signal is easily obtained (in this case, it is known a priori, by design).

It is to be understood that the embodiments and variations shown and described herein are merely illustrative of the principles of this invention and that various modifications may be implemented by those skilled in the art without departing from the scope and spirit of the invention.

I claim:

1. A method for processing a received signal on one or more twisted pair, said method comprising the steps of:
    generating a differential component of said received signal;
    generating a common mode component of said received signal; and
    reducing alien cross-talk from said received signal by applying a vector comprised of said differential and common mode components to a multi-dimensional adaptive filter having matrix coefficients.

2. The method of claim 1, wherein said alien cross-talk is external noise.

3. The method of claim 1, further comprising the step of equalizing said received signal.

4. The method of claim 1, wherein said reducing step further comprises the step of removing near-end crosstalk that results from a signal on one twisted pair interfering with a signal on another twisted pair.

5. The method of claim 1, wherein said reducing step further comprises the step of removing echo crosstalk that results from cross-talk on the same twisted pair.

6. The method of claim 1, wherein said reducing step is performed by a multi-dimensional finite impulse response filter.

7. The method of claim 1, further comprising the step of generating a vector representation of said differential and common mode components.

8. The method of claim 7, wherein said vector representation includes a differential and common mode component for each twisted pair.

9. The method of claim 1, wherein said common mode component is an average of two voltages.

10. The method of claim 1, wherein said common mode component is an average of two current signals.

11. The method of claim 1, wherein said common mode component is obtained at a center tap between two resistors.

12. The method of claim 1, wherein said reducing step further comprises the step of generating a differential component of a transmitted signal.

13. The method of claim 12, further comprising the step of applying a vector representation containing said differential component of said transmitted signal to a multi-dimensional finite impulse response filter.

14. The method of claim 1, wherein said reducing step further comprises the step of generating a common mode component of a transmitted signal.

15. The method of claim 14, further comprising the step of applying a vector representation containing said common mode component of said transmitted signal to a multi-dimensional finite impulse response filter.

16. The method of claim 1, wherein said reducing step reduces redundant operations performed on said received signal relative to an implementation that employs a scalar representation of said received signal.

17. A receiver, comprising:
    a front end processor for generating a differential component and a common mode component of a received signal; and
    a cross-talk canceller for reducing alien cross-talk from said received signal by applying a vector comprised of said differential and common mode components to a multi-dimensional adaptive filter having matrix coefficients.

18. The receiver of claim 17, wherein said alien cross-talk is external noise.

19. The receiver of claim 17, further comprising an equalizer to equalize said received signal.

20. The receiver of claim 17, wherein said cross-talk canceller is further configured to remove near-end crosstalk that results from a signal on one twisted pair interfering with a signal on another twisted pair.

21. The receiver of claim 17, wherein said cross-talk canceller is further configured to remove echo crosstalk that results from cross-talk on the same twisted pair.

22. The receiver of claim 17, wherein said cross-talk canceller is embodied as a multi-dimensional finite impulse response filter.

23. The receiver of claim 17, wherein said front end processor is further configured to generate a vector representation of said differential and common mode components.

24. The receiver of claim 23, wherein said vector representation includes a differential and common mode component for each twisted pair.

25. The receiver of claim 17, wherein said front end processor obtains said common mode component at a center tap between two resistors.

26. The receiver of claim 17, wherein said cross-talk canceller applies a vector representation containing differential and common mode components of a transmitted signal to a multi-dimensional finite impulse response filter.

27. The receiver of claim 17, wherein said cross-talk canceller is further configured to reduce redundant operations performed on said received signal relative to an implementation that employs a scalar representation of said received signal.

28. A method for processing a received signal on one or more twisted pair, said method comprising the steps of:
   generating a differential component of said received signal;
   generating a common mode component of said received signal;
   measuring said common mode component of said received signal to estimate alien cross-talk; and
   applying a vector comprised of said differential and common mode components to a multi-dimensional adaptive filter having matrix coefficients.

29. The method of claim 28, wherein said applying step reduces redundant operations performed on said received signal relative to an implementation that employs a scalar representation of said received signal.

30. A receiver, comprising:
   a front end processor for generating a differential component and a common mode component of a received signal;
   an estimator for estimating alien crosstalk by measuring said common mode component of said received signal; and
   a multi-dimensional adaptive filter having matrix coefficients for processing a vector comprised of said differential and common mode components.

31. The receiver of claim 30, wherein said multi-dimensional adaptive filter is further configured to reduce redundant operations performed on said received signal relative to an implementation that employs a scalar representation of said received signal.

* * * * *